United States Patent Office 3,714,924
Patented Feb. 6, 1973

3,714,924
DIMENSION CONVERSION INDICATOR
Stanislaw Jankowski, Birmingham, and William John Jackson, Tamworth, England, assignors to Cincinnati Milacron Inc., Cincinnati, Ohio
Filed July 23, 1971, Ser. No. 165,557
Int. Cl. B23q 17/00
U.S. Cl. 116—115.5         5 Claims

ABSTRACT OF THE DISCLOSURE

A dimension conversion indicator for a machine having relatively movable members and adapted to indicate the relative displacement of the members selectively in English or metric units has a rotatable dial bearing respective scales in these units and driven through a variable ratio gearbox from a shaft which rotates with relative movement of the members. The gearbox comprises an axially shiftable outer gear unit and two inner gear units coupled respectively with the dial and with the shaft. The outer gear unit is constantly meshed with one inner gear unit and can be meshed with a selected one of the two gear elements on the other inner unit to select the required ratio. A rotatable handle can be clutched to the inner gear unit coupled with the dial to enable the shaft to be rotated manually, the gearbox providing a transmission ratio between the handle and the shaft corresponding to the scale for time being in use.

BACKGROUND OF THE INVENTION

This invention relates to a dimension conversion indicator for co-relating the relative movement between members of a machine with relative angular movement between a dial and an indicator means wherein the dial means has respective different scales.

The invention has been developed primarily to meet the requirement for an indicator capable of being applied to a rotary feed spindle of machine tools. Such feed spindles are usually in the form of lead screws and are required to be operatively coupled to an associated indicator in which the dial means has a scale which will indicate the feed movement imparted to the particular part of the machine tool controlled by such spindle for a given angular displacement of the dial means. The spindle will often be driven by power means but frequently also it is necessary for the spindle to be operated by a manually operable handle.

Dimensions of length are commonly measured in accordance with two well recognised scales, these being the English or American scale in which the unit of length is the inch, and the metric scale in which the unit of length is the metre.

It is an increasing requirement that a single relative rotation between the dial and indicator means, or of the handle, should correspond to or bring about a relative (usually translational) displacement between the members of the machine controlled thereby which is a convenient whole number of reciprocal thereof expresed in terms of the metric system, or expressed in terms of the inch system. In a typical case a single rotation of such spindle may produce a translatory displacement of the controlled member by 0.2 inch, which is ⅕ of an inch expressed as a reciprocal (such displacement being displayed by the inch scale of the dial and indicator means), whereas without the provision of a dimension conversion indicator the corresponding translational displacement expressed in accordance with the metric scale (and indicated by the metric scale of a dial and indicator means) would be 5.08 mm.

The requirement to be met, therefore, is to ensure that when operating in accordance with the metric scale a single relative rotation between the dial and indicator means and/or of the handle shall correspond to or produce 5/5.08 of a rotation of the machine feed spindle, instead of a complete rotation, this fraction of a complete rotation corresponding to a relative translational displacement between the members of the machine of the control part being exactly 5.0 mm.

This requirement has been expressed for simplicity in terms of a specific example but it will, of course, be understood that the present invention is not so limited and that the scale conversion devcie, hereinafter described, may provide conversion as between any two or more scales.

SUMMARY OF THE INVENTION

It is an object of the invention to provide a dimension conversion indicator which fulfils the requirements hereinbefore mentioned.

It is a further object of the invention to provide a dimension conversion indicator of more compact form than those hitherto available.

According to one aspect of the invention there is provided a dimension conversion indicator comprising a transmission means for operatively connecting a shaft which rotates with movement of the members and a dial and indicator means, which transmission means includes an internally toothed outer gear unit which is axially shiftable between first and second positions, and two externally toothed inner gear uints, both of which are arranged to mesh with the outer gear unit, and which are drivingly connected with said shaft and with said dial and indicator means respectively, the first and second positions of the outer gear unit providing respective transmission ratios between the shaft and the dial and indicator means having the same relationship to each other as do first and second scales provided on the dial means.

With this arrangement, the inner gear units are disposed within the outer gear unit and accordingly the transmission means as a whole is relatively compact. Furthermore, since the outer gear unit necessarily has a diameter greater than the respective diameters of the inner gear units, the speed of rotation of the outer gear unit is less than the respective speeds of the inner gear units and the presence in the transmission means of one or more elements which rotates at a speed substantially greater than the speed of rotation of the shaft is avoided. Preferably there is further provided manually operable handle means settable in operative and inoperative relation to said shaft so that an operator can rotate the latter manually to cause relative displacement of the members of the machine.

In the preferred construction, there is further provided clutch means for selectively coupling the handle means to the one of said inner gear units which is connected with said dial and indicator means.

With this arrangement the transmission means provides two alternative transmission ratios between the handle means and the shaft, these alternative transmission ratios having the same relationship to each other as do the first and second scales of the dial means. Rotation of the handle means through a given number of complete revolutions, which can be counted by the operator, can thus be effected to bring about a unit of relative displacement between the controlled members of the machine in accordance with either the first or the second scale, as selected. However, the handle need not, and for safety reasons will not normally, remain coupled to the shaft when the latter is required to be rotated under power. The scale conversion facility is not thereby lost since the dial and indicator means continue to be driven in co-ordination with the shaft to indicate displacement of the controlled members in accordance with the selected one of the scales.

DESCRIPTION OF THE PREFERRED EMBODIMENT

Figure 1:
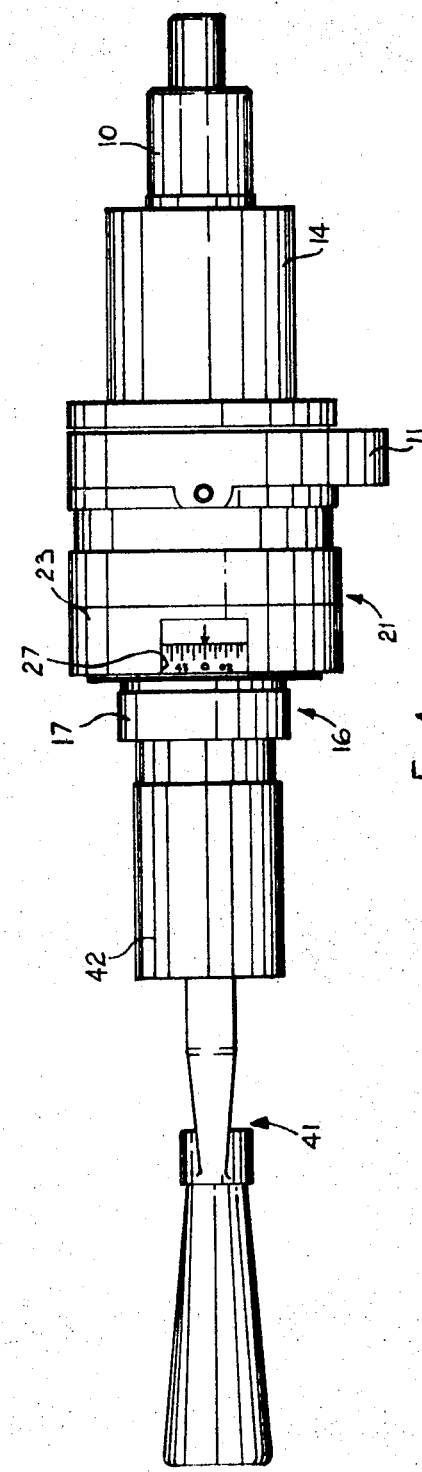
FIG. 1 is a plan view of one embodiment of the invention, the indicator means and outer gear unit being in a first axial position.

The embodiment illustrated is intended for use on a machine tool wherein relative translational movement between members of the machine, such as the body or supporting structure and a feed slide or tool holder, are brought about by a rotary spindle such as a lead screw operatively associated with one or both of such members through screw and nut means or the like (omitted from the drawings for the sake of clarity).

Such spindle is intended to be driven by, or to drive as appropriate, a shaft of the indicator, namely the shaft 10 which is adapted in any suitable manner for coupling to the spindle of the machine.

The indicator further comprises a body member 11 adapted to be secured by machine screws (not shown) passing through holes in the body member 11 into a structural member 13 of the machine. The body member 11 is of generally annular form and is assembled with a bearing housing 14 disposed in an aperture in the member 13 of the machine and secured thereto by machine screws, one of which is shown at 12 in FIG. 2. The bearing housing serves to support the shaft 10 rotatably by means of axially spaced roller bearings 15.

The indicator includes a dial member 16 arranged concentrically about the spindle 10 and adapted to be driven rotatably, as hereinafter described. The dial member 16 has portions 17 and 18 of respectively smaller and larger diameters, and the outer circumferential face of the portion 18 carries, or is marked, with respective scales extending circumferentially around this face. These scales are located typically at 19 and 20, that is to say they are axially spaced from each other.

Each scale is composed of scale divisions with a number of complete divisions occupying the entire circumference and representing a whole number, or reciprocal, of the basic units of each scale; the basic unit of one scale may be an inch and the basic unit of the other scale may be a metric unit such as a millimetre. Typically, but not essentially, the scale divisions are so marked that a complete rotation of the inch scale registers relative movement between the members of the machine of 0.2 inch, and the metric scale relative movement of 5.0 mm.

As illustrated, 19 designates the inch scale and 20 the metric scale.

Associated with the dial member 16 is a combined selector member 21 which again has portions of smaller and greater diameter 22 and 23. The portion 22 is received within a circular aperture afforded by the body member 11 and is held against rotation relatively thereto by means of a pin 24 on the body member 11 which engages an axially extending slot 25 in the combined selector and indicator member.

Figure 2:
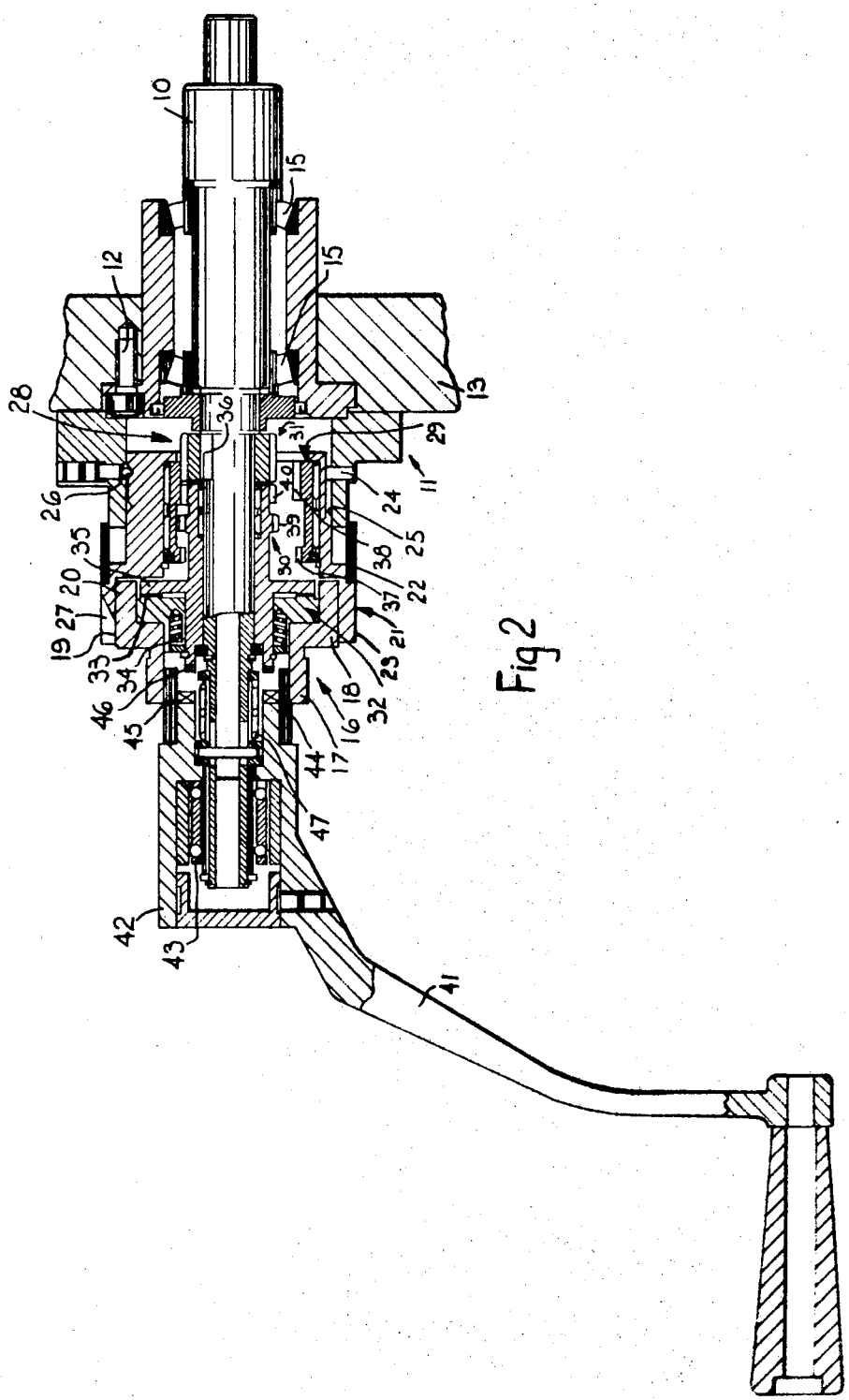
FIG. 2 is a side view in diametral cross-section showing the embodiment of FIG. 1 attached to a portion of a machine and with the parts occupying the same positions as FIG. 1.
Figure 3:
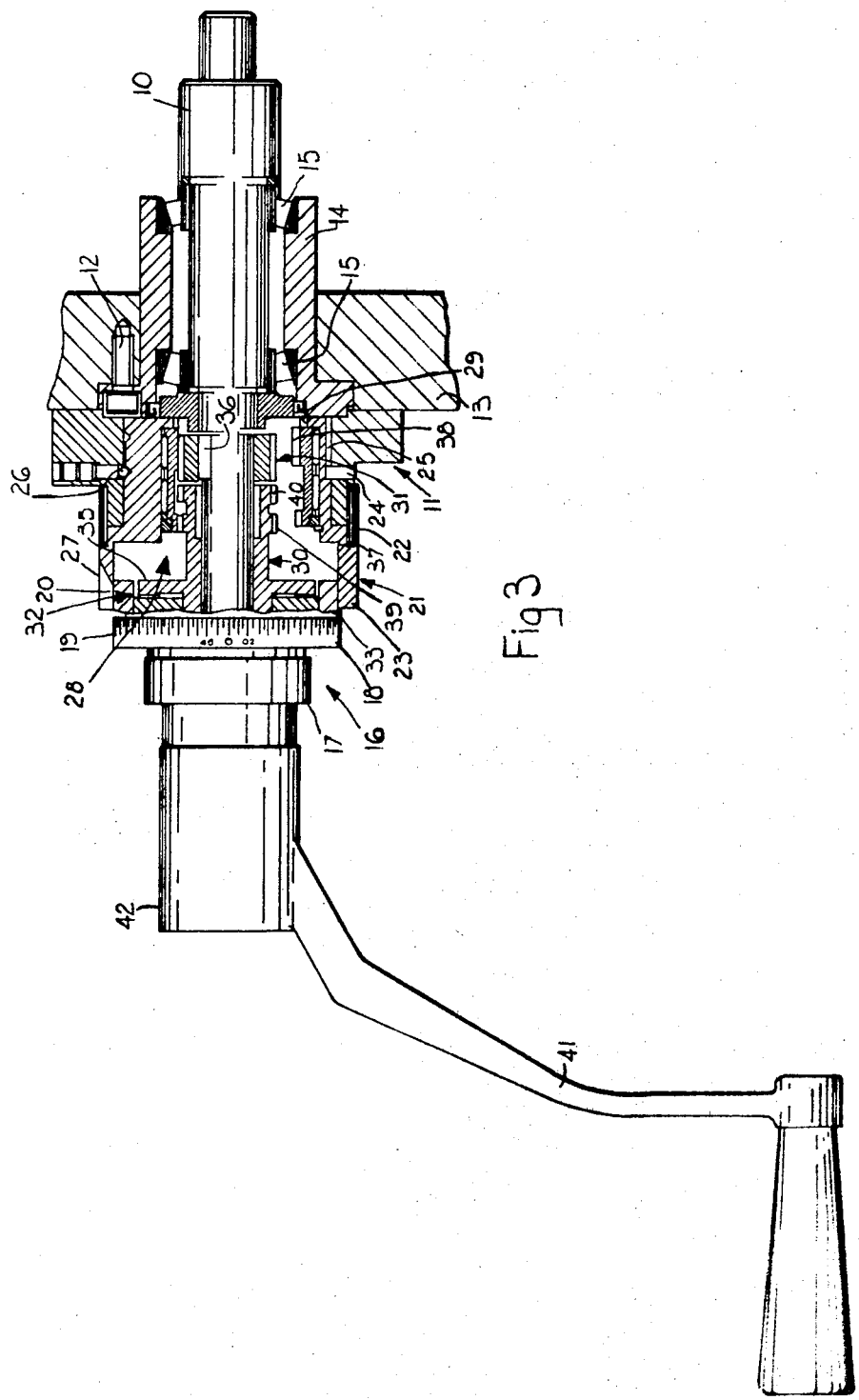
FIG. 3 is a view in side elevation and partly in diametral cross-section, the indicator means and outer gear unit being shown in a second axial position.

The latter is, however, axially movable between a first position in FIGS. 1 and 2 and a second position which would be attained by axial displacement of this member to the right, and which is shown in FIG. 3. The two positions are defined by engagement of a spring pressed ball 26 in respective depressions in the portion 22 of the combined selector and indicator member.

The portion 23 of this member may have an open ended slot or window 27, the inner boundary of which may be formed with a reference line, arrow or projection providing visual registration with any one of the graduations of the scale selected for use. In the first position shown it will be noted that the combined selector and indicator member overlies the scale 20 but exposes a part of the scale 19 in the window 27; whereas in the second position the scale 19 is completely exposed and a part of the scale 20 is exposed in the window. In this second position the reference line or the like is disposed only adjacent to the scale markings of the scale 20, so that it would be impossible for the scale 19 to be accurately read. However, the end portion of the combined selector and indicator member could be modified, if desired, to produce exposure of only one scale in each of its two positions, if desired.

Driving connection between the dial member 16 and the shaft 10 is established through a transmission means 28 accommodated in the interior of the smaller diameter portion 22 of the combined selector and indicator member. This transmission means comprises an outer internally toothed gear unit 29 rotatably supported in the portion 22 of the combined selector and indicator member but fixed axially against movement relatively thereto, and two inner gear units 30 and 31.

The inner gear unit 30 is drivingly connected to the dial member 16 through the intermediary of a yieldable or non-prohibitive clutch means 32. This comprises a clutch disc 33 fixed to, and movable rotationally and axially with, the dial member 16 and urged to the right by a spring 34. Such disc co-operates with a radially projecting flange 35 on the inner gear unit 30. The disc and the flange may have radial teeth or serrations which provide a plurality of discrete positions of adjustment relative to angular adjustment. Such adjustments, as for zeroing, can be effected by grasping the portion 17 of the dial member and moving same axially to the left to disengage clutch disc 33 and flange 35.

A hand crank 41 is mounted on the shaft 10 by way of a hollow hub 42 containing a ball bearing 43. Coupling between the hand crank and the shaft 10 is effected by way of a clutch 44, one element 45 of which is formed at the inner end of the handle hub, and the other element 46 of which is formed at the adjacent end of the inner gear unit 30 which is drivingly connected to the dial member.

Engagement of the clutch 44 which is normally maintained in the disengaged position by a spring 47 is effected by axial displacement of the hand crank 41 to the right, and this serves to drive the inner gear unit 30.

The other inner gear unit 31 is drivingly connected to the shaft 10 by means of a key 36.

The outer gear unit is formed internally with two gear elements 37 and 38, the former of which in the first position of the combined selector and indicator member (and outer gear unit) is out of mesh with a gear element 39 of the inner unit 30, and is in mesh with this gear element in the second position of the combined selector and indicator member (and hence outer gear unit).

The second gear element 38 of the outer gear unit is constantly in mesh with the gear element constituted by the unit 31, the external face of which is formed along its entire length with gear teeth, and is brought respectively into and out of mesh with a further gear element 40 on the inner unit 30 according to whether the combined selector and indicator member occupies its first or second position respectively.

Typically gear element 39 has twenty-seven teeth, gear element 37 has thirty-five teeth, gear element 38 has thirty-seven teeth, and gear elements 40 and 31 have twenty-nine teeth.

The overall transmission ratio, therefore, provided between the dial member 16 and the shaft 10 in the first position of the combined selector and indicator member is $29/37 \times 37/29 = 1$. A single rotation of the shaft 10 will thus result from a single rotation of the hand crank 41 and the dial member 16 and this will in the present example be appropriate to operation on the inch scale 19.

In the second position of the combined selector and indicator member, the transmission ratio will be 27/35 ×37/29=5/5.08.

In this position, therefore, the shaft 10 will rotate 5/5.08 of a revolution for each complete revolution of the hand crank 41 and dial member 16.

Rotation of the hand crank 41 is transmitted to the shaft 10 by the particular set of gear elements in engagement, as determined by the position of the combined selector and indicator member as already described. Accordingly, for a complete revolution of the hand crank 41, the shaft 10 will rotate through either a complete revolution in the first position of the combined selector and indicator member or through 5/5.08 of a revolution in the second position of this member.

If the rotary spindle or lead screw of the machine has a thread of a pitch to provide displacement of the members of the machine by a whole number of reciprocal thereof according to the metric scale, and the device of the invention were required to provided conversion to operation in accordance with the inch scale, then the gear elements would require to be re-arranged to provide alternative ratios of 1 (for metric operation) and 5.08/5 (for inch operation).

In some cases ability to cause by one or more complete revolutions of the hand crank 41 a relative displacement of the members of the machine of 1 inch, or alternatively a displacement of 1 centimetre is not required, the clutch 44 may then be substituted by a clutch adapted to couple the hand crank directly with the shaft 10.

In an alternative embodiment which, for example, may be employed where two conversion indicators are required to be positioned side-by-side in association with respective shafts which would be coupled to two different lead screws of the machine, means alternative to the hand crank 41 may be provided for manual rotation of the shafts. In this embodiment (not illustrated) the hub 42 and hand crank 41 are omitted, and the shaft 10 terminates at a position within the smaller diameter portion 17 of the dial member. Conveniently, the open end of the dial member would be closed by a plug positioned adjacent to the forward end of the shaft 10.

The construction and operation of the dial and indicator means and transmission means would be identical with that of the embodiment illustrated in the accompanying drawings.

When this alternative form of the conversion indicator is employed in a machine, a hand wheel or hand crank would normally be provided with an associated drive shaft which can be coupled by clutch means with the shaft of the conversion indicator, or with the lead screw associated therewith. It will be apparent that unless the hand wheel or crank drives through some form of variable transmission means, this arrangement would enable relative displacement of the members of the machine by either 1 inch or 1 centimetre to be produced by a number of complete revolutions of the hand wheel or crank, depending upon whether the pitch of the lead screw is a simple fraction of an inch or a simple fraction of a centimetre.

We claim:

1. For a machine having relatively movable members, a dimention conversion indicator comprising:

(a) dial and indicator means whereof the dial means is movable relative to the indicator means and is provided with a first scale in one system of units and a second scale in a different system of units, (b) a shaft which rotates with relative movement of said members of the machine, (c) transmission means for operatively connecting said shaft and said dial and indicator means, the transmission means comprising an internally toothed outer gear unit which is axially shiftable between first and second positions, and two externally toothed inner gear units, both of which are arranged to mesh with the outer gear unit and one of which is drivingly connected with said shaft and the other of which is drivingly connected with said dial and indicator means, the first and second positions of the outer gear unit providing respective transmission ratios between the shaft and the dial and indicator means having the same relationship to each other as do the first and second scales, (d) manually-operable handle means, and (e) clutch means for selectively coupling clutch means for selectively coupling said handle means with said other inner gear unit whereby the shaft can be driven by the handle means through the transmission means, the latter providing a selected one of two alternative transmissions ratios between the handle means and the shaft corresponding to the units of the scale for the time being in use.

2. A dimension conversion indicator according to claim 1 further comprising a selector member in the form of an axially slidable sleeve for moving the outer gear unit between its first and second positions, such sleeve being formed or constructed to act as said indicator means in relation to said dial means.

3. A dimension conversion indicator according to claim 2 wherein said first and second sides are spaced axially, said indicator means is in register with one of said scales when said sleeve is in said first axial position, and said indicator means is in register with the other of said scales when said sleeve is in said second axial position.

4. A dimension conversion indicator according to claim 2 wherein said outer gear unit is mounted internally of and supported by said sleeve.

5. A dimension conversion indicator according to claim 4 wherein said sleeve incorporates axially successive portions of respectively smaller and greater diameters internally, the former accommodating the transmission means and the latter accommodating the dial means.

References Cited

UNITED STATES PATENTS

| Re. 26,527 | 2/1969 | Rabinow | 116—115.5 |
| 3,418,965 | 12/1968 | Rabinow | 166—115.5 |
| 3,536,030 | 10/1970 | Schroeder | 116—115.5 |
| 3,536,031 | 10/1970 | Sindall | 116—115.5 |
| 3,580,216 | 5/1971 | Weber | 116—115.5 |

LOUIS CAPOZI, Primary Examiner

U.S. Cl. X.R.

33—166; 74—813